US010430487B2

(12) United States Patent
Cattone et al.

(10) Patent No.: US 10,430,487 B2
(45) Date of Patent: Oct. 1, 2019

(54) SYSTEM AND METHOD TO SHARE CONTENT UTILIZING UNIVERSAL LINK FORMAT

(71) Applicant: PayPal, Inc., San Jose, CA (US)

(72) Inventors: Jeremy Leigh Cattone, Tigard, OR (US); Troy Steven Acott, Beaverton, OR (US)

(73) Assignee: PAYPAL, INC., San Jose, CA (US)

(*) Notice: Subject to any disclaimer, the term of this patent is extended or adjusted under 35 U.S.C. 154(b) by 72 days.

(21) Appl. No.: 14/245,802

(22) Filed: Apr. 4, 2014

(65) Prior Publication Data
US 2015/0286737 A1 Oct. 8, 2015

(51) Int. Cl.
G06F 17/20 (2006.01)
G06F 16/955 (2019.01)
G06F 3/0484 (2013.01)
H04L 29/08 (2006.01)

(52) U.S. Cl.
CPC ...... G06F 16/9566 (2019.01); G06F 3/04842 (2013.01); H04L 67/02 (2013.01)

(58) Field of Classification Search
CPC ..... G06F 17/2247; G06F 17/24; G06F 17/211
See application file for complete search history.

(56) References Cited

U.S. PATENT DOCUMENTS

| 6,167,441 | A | * | 12/2000 | Himmel | ................... | H04L 29/06 709/217 |
| 8,230,417 | B1 | | 7/2012 | Clark et al. | | |
| 2002/0013833 | A1 | | 1/2002 | Wyatt et al. | | |
| 2004/0172635 | A1 | | 9/2004 | Watt et al. | | |
| 2005/0251857 | A1 | | 11/2005 | Schunter et al. | | |
| 2008/0134049 | A1 | * | 6/2008 | Gupta | ................... | G06F 9/4843 715/738 |
| 2011/0145598 | A1 | | 6/2011 | Smith et al. | | |
| 2011/0209128 | A1 | * | 8/2011 | Nikara | ................... | G06F 8/47 717/140 |
| 2012/0159308 | A1 | * | 6/2012 | Tseng | ................... | G06F 3/04847 715/234 |
| 2012/0221724 | A1 | * | 8/2012 | Chor | ................... | G06F 16/9566 709/225 |
| 2013/0191265 | A1 | | 7/2013 | Nanwani | | |

(Continued)

OTHER PUBLICATIONS

International Search Report and Written Opinion, as issued in connection with International Patent Application No. PCT/US2015/024174, dated Jul. 8, 2015, 9 pgs.

Primary Examiner — Shahid K Khan
(74) Attorney, Agent, or Firm — Maschoff Brennan

(57) ABSTRACT

A system to share content utilizing universal link format is described. The system may an access request detector, a universal link interpreter, and a communication module. The access request detector may detect a request to access target content provided by a resource host computer. The universal link interpreter may determine that the request is associated with a uniform resource locator (URL) that comprises one or more directives for directing the requested content to an execution environment suitable for a platform of the client computer, may determine a platform of the client computer, and determine execution environment for the requested target content. The universal link interpreter may then interpret the one or more directives in the URL, based on the determined execution environment.

18 Claims, 7 Drawing Sheets

(56) References Cited

U.S. PATENT DOCUMENTS

| | | | |
|---|---|---|---|
| 2013/0219024 A1* | 8/2013 | Flack | H04L 67/2804 709/219 |
| 2013/0254037 A1* | 9/2013 | Foster | H04W 4/21 705/14.64 |
| 2014/0129733 A1* | 5/2014 | Klais | H04L 67/327 709/239 |

* cited by examiner

SYSTEM AND METHOD TO SHARE CONTENT UTILIZING UNIVERSAL LINK FORMAT

TECHNICAL FIELD

This application relates to the technical fields of software and/or hardware technology and, in one example embodiment, to system and method to share content utilizing universal link format.

BACKGROUND

On-line or web content provided by a web application may be accessed at a client device via a browser application executing on a client device. On a mobile device, e.g., on a smartphone, tablet, etc., web content provided by a web application may be accessed via an application that is native to a particular mobile device (a native or mobile app). A native app can be installed directly onto the mobile client device. Some existing web-based services, such as, e.g., services provided by an on-line networking system or by an on-line trading platform, may be accessible to a user from a mobile device via a browser application or, alternatively, via a native app.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
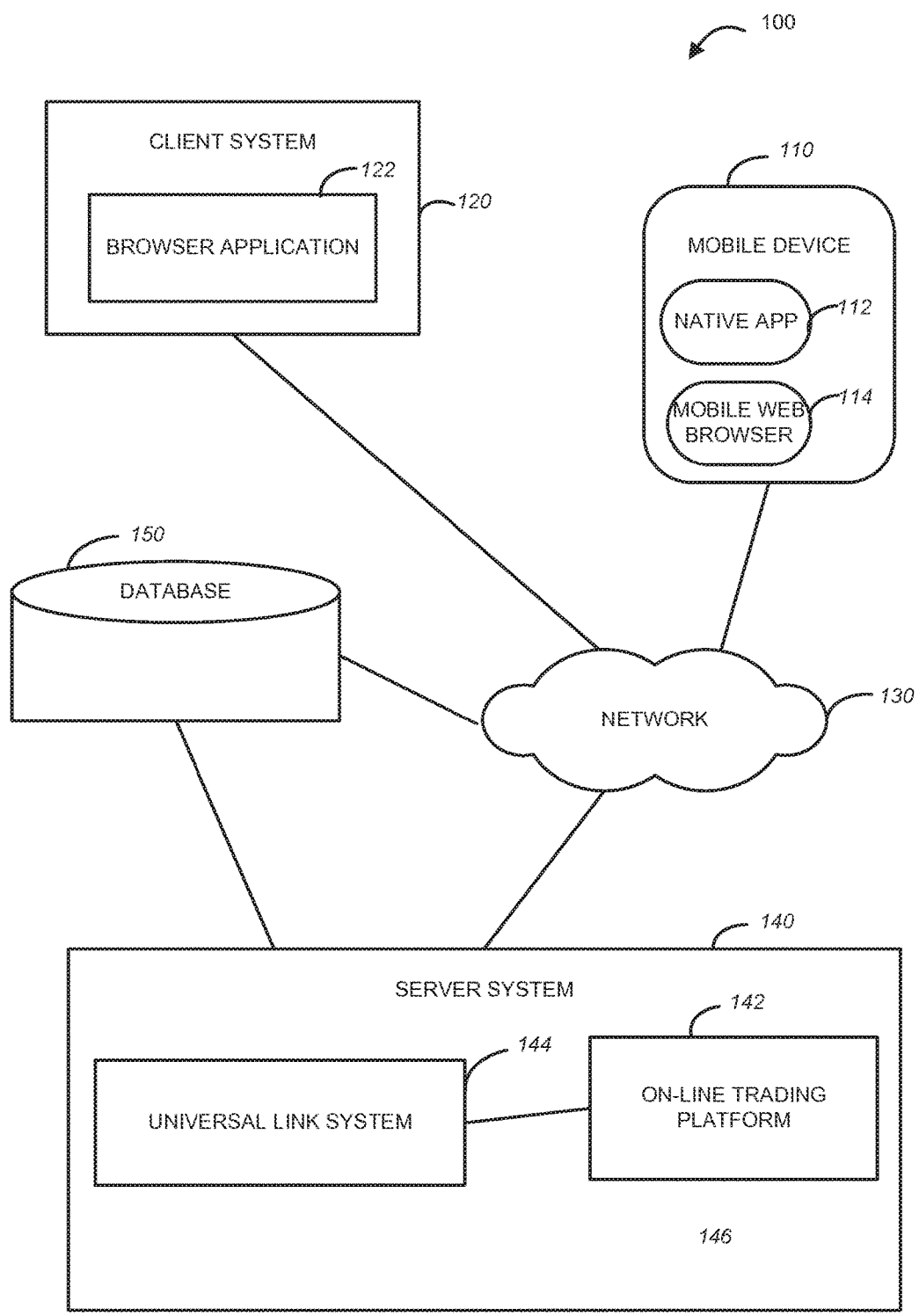
FIG. 1 is a diagrammatic representation of a network environment within which an example method and system to share content utilizing universal link format may be implemented.

Method and system are provided for sharing content utilizing universal link format. In the following description, for purposes of explanation, numerous specific details are set forth in order to provide a thorough understanding of example embodiments. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based and JavaScript-based servers and related environments, the embodiments are given merely for clarity in disclosure. Thus, any type of server environment, including various system architectures, may employ various embodiments of the application-centric resources, systems, and methods described herein, and is considered as being within a scope of the present invention.

Method and system described herein permit sharing content in a cross-platform and cross-channel manner, permitting dynamic selection of execution environment, target content, and navigation behaviour, based upon the type of the receiving device and other factors.

In one embodiment, the method may be used as described below.

1. A user is accessing a web site provided by a web application from a client device. The client device may be a desktop computer, a mobile device or other device. On a mobile or some other device, a user may have installed a native app corresponding to the web site provided by a web application. The approaches described herein may be utilized to drive downloads of native apps, as well as to activate apps that are installed but not currently active on a user's device.
2. The user chooses to share a content item (also referred to as target content) that is represented/hosted on the web site, or that could be pushed to and hosted on the web site or some other location. A computer system hosting the web application that provides the web site may be termed a resource host computer.
3. The user shares a uniform resource locator (URL) that references the content item and the location of the content item. Sharing channels may include any application that can be used to exchange information electronically. The user may communicate the URL to another computer system or to the computer system they are operating, such that the content item may be accessed in the future.
4. 
5. The recipient of the shared content item (which could be the same user who shared the content with himself, or another user) clicks on the URL (e.g., clicks on a hyperlink that references the URL) at the recipient's client device.
6. The URL reaches out to the resource host computer referenced in the URL with a request to activate the content item on the recipient's device.
7. Prior to the URL being sent to the resource host computer, a module executing on the recipient's client device detects the platform of the recipient's client device. The recipient's client device may be, e.g., a desktop computer, a smartphone, a tablet, etc. The platform of the recipient's client device may be determined by a module (e.g., a JavaScript script) that has been previously delivered to the recipient's computer. In an alternative implementation of the universal link (as a true service) the determining of the client platform may be performed on the server side, using a various approaches (e.g, the 'User-Agent' HTTP header).
8. Based upon the determined platform, the form factor of the recipient's client device, and possibly on other factors, the optimal execution environment, as well as the landing page, navigation behaviour, etc. for the target content may be selected. For example, on a mobile device it may be deemed optimal to open the content item within the native mobile app corresponding to the web site, whereas on a desktop computer it may be preferable to access the web site via a browser application.

9. The web application executing on the resource host computer (or a JavaScript script that has been previously delivered to the recipient's computer) attempts to launch the optimal execution environment (such as, e.g., a native app corresponding to the web site) and also detects whether the optimal execution environment has been successfully launched on the recipient's client device. This can be determined, e.g., via a timeout test, or via platform application programming interfaces (APIs) that could indicate whether the native app is installed on the device.

The web application (or a JavaScript script that has been previously delivered to the recipient's computer) may be configured to download/obtain/prepare the optimal execution environment for the recipient's client device if it is not already present on the recipient's client device. The web application (or a JavaScript script) may also be configured to open the content item in an alternative (fallback) execution environment. Detection of the optimal execution environment and fallback operations may be performed until the content item is successfully presented to the recipient.

The URL that is sent to the resource host computer can contain parameters that specify the intended landing page within the recipient's execution environment. These parameters can be customized based on the platform of the recipient's client device, based on the execution environment, etc. In addition to the preferred execution environment, the URL can also specify the existence of fallbacks, the order of fallbacks, as well as the fallback behaviour (e.g., ignoring the default/primary path, and instead proceeding directly to the secondary/fallback path). In addition to the information with respect to the preferred execution environment and fallbacks, other parameters passed in a URL may include parameters to allow attribution tracking, tracking of final user, the duration of an associated campaign when the URL is a marketing link implementing, etc. A URL that includes parameters that contain one or more of elements of redirection to an application suitable for a particular platform (e.g., the native app or mobile web), alternative path (fallback) behaviours, app launch detection, and landing page selection and parameterization, may be referred to as having universal link format or as a universal link.

In operation, a URL in a universal link format that is being exposed to a client device may target content that is supplied by the client device or by some other resource host. The URL may include a 'nay' parameter, an 'alt' parameter, and also a 'nav_<plat>' or 'alt_<plat>' override. The URL is interpreted first by the client platform, to determine how the URL should be handled. The URL's initial interpretation is typically by a native application (such as a native app or a browser). In the case where the URL is interpreted by a native app, the universal link is interpreted directly on the client device based upon the app's own knowledge of the platform, without requiring that another computer be consulted for initial interoperation of the link. In the case of a browser, the browser may contact the resource host identified in the URL, or launch a native app if the browser or platform (and possibly user) allows and selects native applications to handle the link (such as is the case for market links). If a resource host is contacted, the resource host may examine the request to determine the platform and redirect the client device to a platform-specific destination, optionally using a mechanism that allows for 'fallback' if the primary execution environment (e.g., the native app) cannot be launched. Alternatively, the host may deliver content (e.g., JavaScript) that allows the client to perform the subsequent platform detection, URL interpretation, and content redirection entirely within the client execution environment. In some embodiments, method and system for sharing content utilizing universal link format may be extended using the approaches described below.

In one embodiment the parameters would not be passed in the URL, but instead some identifier would be passed and the parameters would be looked up. The "campaign" or "use-case" would be pre-created and the parameters stored in a database, for example, so they can be changed later in case the target optimal environment or other details need to be changed.

Method and system for sharing content utilizing universal link format may be extended by adding support to the specification for campaign lifecycle management through the URL (e.g., by implementing absolute and time-since-clicked campaign expiration times). For example, a universal link may include parameters indicating that the link is valid through the end of July, but for duration no longer than one week from the time it is clicked. Thus, a user clicking on the link would be delivered to the targeted landing page when following the link prior to the end of July. However, the native app could also have been opened to the targeted landing page via the universal link, and then closed. When the user returns to the application after longer than a week, the native app may detect, via the parameters in the original universal link, that the current landing page was only valid for one week, and thus deliver the user to a generic/home page instead of restoring the expired landing page upon startup.

Method and system for sharing content utilizing universal link format may be extended by adding transitive attribution support (e.g., by permitting multiple marketing partners to wrap or decorate a URL to preserve the original attribution, while ensuring that each partner is also included in attribution), e.g., by utilizing a campaign management and retargeting service (CMRS). For example, an advertiser releases a universal link promoting a particular product. CMRS may wrap that URL to provide dynamic campaign control. A search engine may find the wrapped link, and re-expose it in search results. All three of these participants the advertiser, the provider of CMRS, and the provider of the search engine—should be credited with contributions to driving the user into the application. Instead of supporting only a single 'referrer', the universal link may provide support for multiple referrers, or an 'origin' and 'current' referrers—either of these mechanisms can be used (in certain use cases) to establish the complete chain of referral.

Method and system for sharing content utilizing universal link format may be extended by adding support for in-app links on mobile clients. On some platforms, in-app web content may handle universal links differently, e.g., in order to avoid popping up a new browser window when a universal link is followed form within the app. For example, if an in-app message or an email contains a universal link, it would be desirable that clicking upon the universal link navigates directly within the app, rather than launching the device's web browser before returning to the app.

Method and system for sharing content utilizing universal link format may also be extended by providing an intermediate redirect from a web-based landing page to resolve a universal URL to a platform-specific URL before it is being handled by a native app. For example, a universal link may be constructed to contain directives for all platforms expected to follow the link. Thus, directives such as nav_dt (indicating desktop), nav_ie (indicating iPhone platform), and nav_andr (indicating Android platform) may all appear, and can be interpreted on each platform. In some embodiments, a webpage or a service could be used to examine the universal link and the client platform, from which the web page is being accessed, and to subsequently redirect to a URL that has been pre-parsed, in order to provide parameters that are specific to the target platform. This allows for the universal link to be consumed on platforms that do not have the ability to execute JavaScript, or otherwise parse and interpret a universal link on the client device.

Method and system for sharing content utilizing universal link format may be extended by adding token-based parameterization of a custom interstitial. The custom interstitial functionality may be designed to provide an intermediate landing page, with the ability to click through to the final page. A universal link may be constructed to contain a parameter providing an instruction of how the interstitial link is constructed (e.g., does it contain the market, native, or web-based link as the click-through, does it append additional referrer parameters, etc.).

Method and system for sharing content utilizing universal link format may be extended by permitting insertion of unique tracking tokens into the data provided to the native app, in order to facilitate tracking correlation. In some embodiments, it may be desirable that the back-end system receives sufficient information to fully correlate the original web click with the final activation of the native app. By capturing click-unique data in the initial visit to the universal link (e.g., the universal link server could inject a unique token into the referrer parameters of the universal link, and then record information about the device and the referrer associated with the original click), the final link contains enough information to correlate future activity of the native app with the original click through information present in the back-end database.

Parameterization of a URL to permit multi-platform landing page and application launch behavioral specialization within a single link URL may be used beneficially in any scenario where data is being shared electronically. For example, a method for sharing content utilizing universal link format may be used in the context of electronic payment systems, systems for sharing audio and video content, etc.

An example method and system to share content utilizing universal link format may be implemented in the context of a network environment 100 illustrated in FIG. 1. As shown in FIG. 1, the network environment 100 may include a client devices 110 and 120, and a server system 140. The client device 110 may be executing a native app 112 and/or a mobile web browser 114. The native app 112 may be providing access to services executing on the server system 140, such as, e.g., to services provided by the on-line trading platform 142. The client devices 110 and 120 may have access to the server system 140 hosting the on-line trading platform 142 via a communications network 130. The communications network 130 may be a public network (e.g., the Internet, a mobile communication network, or any other network capable of communicating digital data).

As shown in FIG. 1, the server system 140 hosts a universal link system 144. In one example embodiment, the universal link system 144 is configured to produce and maintain a module—that may be termed a universal link interpreter—for obtaining information about the platform of a client device, determining execution environment for content referenced in a subject URL, and interpreting the subject URL that has parameters that reflect the determined platform, execution environment, and a landing page that represents the content referenced in the subject URL. The universal link system 144 provides the universal link interpreter, which may be implemented in the form of a JavaScript script—to client devices. The universal link system 144 may be related to the on-line trading platform 142 and may be configured to accommodate ad campaigns launched with respect to the on-line trading platform 142. In one embodiment, with respect to content maintained by the on-line trading platform 142, the server system 140 may be referred to as a resource host computer. Data utilized and monitored by the on-line trading platform 142 may be stored in the database 150.

The universal link system 144 may allow hyperlink-capable campaigns and communications to use a single link to drive mobile & desktop users into specific landing pages within the on-line trading platform experience, leveraging the native app if those are available on the client device, optionally driving downloads of the native apps downloads if needed, and using either the mobile or desktop web experience when a native app is not available. Return on Investment (ROI) attribution may be maintained through these links & downloads. For example, a universal link may carry 'referrer' information that identifies the partner or the source of the link. This information can be used to direct revenue sharing, to tune subsequent content exposure, or simply for tracking metrics. An example system that includes a universal link interpreter and is executing on a client device is illustrated in FIG. 2.

Figure 2:
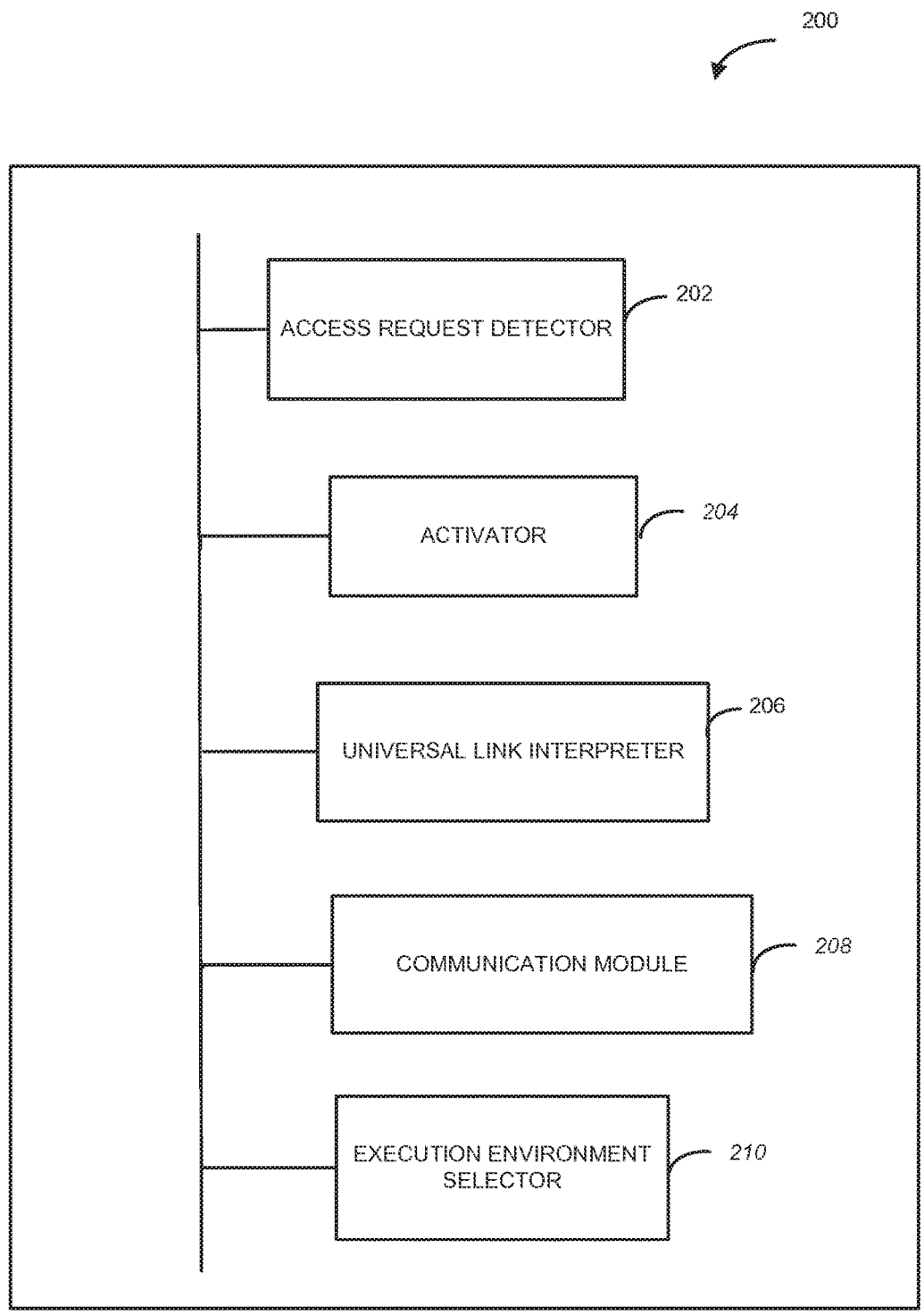
FIG. 2 is block diagram of a system to share content utilizing universal link format, in accordance with one example embodiment.

FIG. 2 is a block diagram of a system 200 to share content utilizing universal link format, in accordance with one example embodiment. In one embodiment, the system 200 resides at the client device 110 or the client device 120 of FIG. 1. As shown in FIG. 2, the system 200 includes an access request detector 202 and a universal link interpreter 206. The access request detector 202 may be configured to detect, at a client computer, a request to access target content, the target content provided by a resource host computer. The request to access the target content may be in response to a click on a URL at the client device or, e.g., in response to a click on a user interface (UI) element presented on a web page, a short message service (SMS) text, in-app messaging, in-app promotions, banners, etc. It will be noted that the target content may be abstract in a sense—while it could be a specific/concrete item page, it could also be an abstract flow (e.g., the 'selling flow,' or a platform-dependent market operation such as 'download'). A universal link could refer to information available on any device that may be accessed from the execution environment present on a client computer. For example, a universal link may refer to information available on a paired bluetooth device (if available), in a vehicle, on one of the user's other devices, in a local kiosk, on a particular device available on the current wifi/widi/wan/(etc) network, etc.

The activator 204 may be configured to activate the universal link interpreter 206, in response to the request. The universal link interpreter 206 may be configured to determine that the request is associated with a URL in a universal link format and that the URL comprises one or more directives. The one or more directives may include a parameter for directing the requested target content to an execution environment suitable for a platform of the client computer and a landing page selection parameter for selecting a landing page associated with the target content. A URL having a universal link format may include platform-agnostic and platform-specific directives suitable for one or more client computer platforms. These directives may be interpreted by universal link interpreter 206 to identify or modify, respectively, the selection of execution environment (both preferred and fallback) and the selection and parameterization of a landing page associated with the target content. For example, a URL having a universal link format may include the 'nav' parameter, as well as optional 'alt', and 'nav/alt_<plat>' directives. In some embodiments, a universal link may be created ahead of time, and possibly templated. A templated universal link may be instantiated (e.g., certain tokens, such as the referrer may be replaced by 'live' values) by an ad delivery system, but the structure, alt path selection, etc. remains fixed at the time the campaign is created.

The universal link interpreter 206 may further be configured to determine the platform of the client computer, to determine the preferred and, possibly, alternative execution environments for the requested target content based on the determined platform of the client computer, and interpret the one or more directives in the URL, based on the determined execution environment(s). In some embodiments, the platform of the client computer maybe determined by at least one execution environment, in which the content request is interpreted, such as, e.g., a native application or JavaScript script, or by the resource host computer based upon characteristics of the initial request. For example, the URL's desired behavior may be resolved by identifying and interpreting any 'nav_<plat>' and 'alt_<plat>' directives in the universal link where '<plat>' is a placeholder corresponding to a predetermined identifier representing an equivalence class of platform applicable to the current platform, such as, e.g., "dt" (desktop), or "andr" (Android). Some examples of the execution environment include a browser application and a native app that may be provided on a mobile device. The platform of the client device may be a mobile platform, a desktop, etc. The universal link interpreter 206 may be further configured to determine that the desired execution environment is not present on the client device and, in response, cause the desired execution environment (e.g., a native app) to be downloaded to the client device. In one embodiment, the universal link interpreter may be implemented as a JavaScript script.

Also shown in FIG. 2 are a communication module 208 and an execution environment selector 210. The communication module 208 may be configured to provide the universal link to the resource host computer and to receive the target content that the resource host computer sends to the client device in response to receiving the universal link. For example, in the context of an on-line trading platform, the target content may be the default landing page or a mobile portal page. The execution environment selector 210 may be configured to access the received the target content in the desired execution environment. In some embodiments, the communication module 208 may also be configured to obtain the universal link interpreter 206 from the resource host computer in response to the detecting of the request. Example operations performed by the system 200 are described with reference to FIG. 3.

Figure 3:
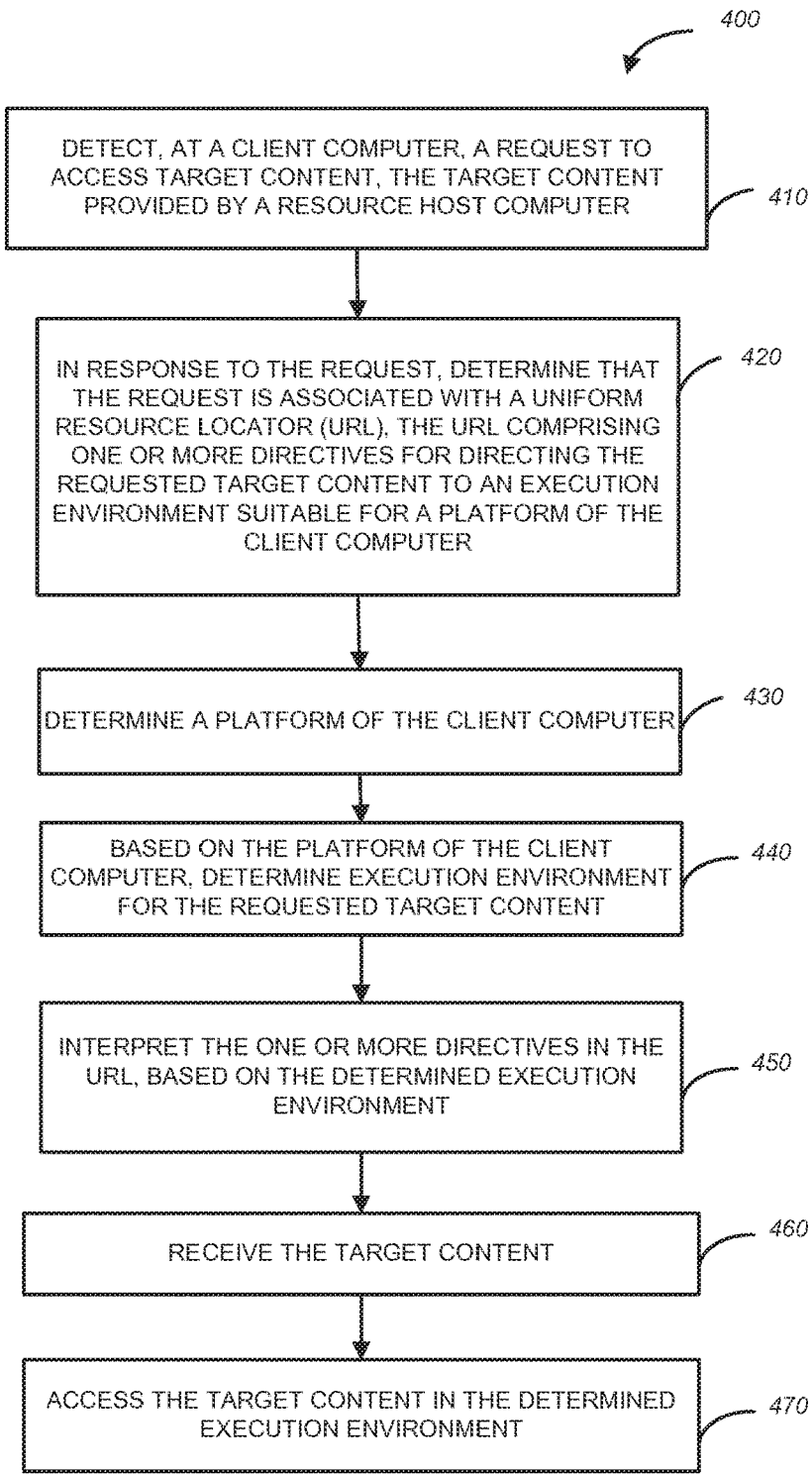
FIG. 3 is a flow chart of a method to share content utilizing universal link format, in accordance with an example embodiment.

FIG. 3 is a flow chart of a method 300 to share content utilizing universal link format, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the client device 110 or 120 of FIG. 1.

As shown in FIG. 3, the method 300 commences at operation 310, when the access request detector 202 detects, at a client computer, a request to access target content provided by a resource host computer. As mentioned above, the request to access the target content may be in response to a click on a URL at the client device or, e.g., in response to a click on a user interface (UI) element presented on a web page. At operation 420 the universal link interpreter 206 determines that the request is associated with a uniform resource locator (URL) and that the URL comprises one or more directives for directing the requested target content to an execution environment suitable for a platform of the client computer, in response to the request. The universal link interpreter 206 determines a platform of the client computer at operation 430. At operation 440, the universal link interpreter 206 determines the execution environment for the requested target content based on the determined platform of the client computer. At operation 450, the universal link interpreter 206 interprets the one or more directives in the URL, based on the determined execution environment.

At operation 460, the communication module 208 receives the target content that the resource host computer sends to the client device in response to receiving the universal link. For example, as mentioned above, in the context of an on-line trading platform, the target content may be the default landing page or a mobile portal page. The execution environment selector 210 accesses the received the target content in the desired execution environment, at operation 470.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Example Universal Link Navigation Extensions

In the context of an on-line trading platform, the method and system for utilizing universal link format may allow ad campaign owners to customize universal link behavior on a per-platform basis, based on the platform of the client device from which a campaign link is being activated. The link may indicate the deep-link landing page and an alternative path, a so called 'second path' (e.g., a path to the market portal via a web browser when a native app cannot be launched on a client device). This approach may enable use cases, in which the desired campaign behavior varies across platforms, or where driving transactions/revenue is more desirable over driving downloads and where users are directed into the mobile web experience when a native app is not installed on the client device.

In one embodiment, the following parameters may be introduced to the universal link syntax.

nav_<plat>: overrides the landing page for a single platform, or forces a platform into the second path alt: selects a cross-platform 'second path' from several alternatives alt_<plat>: overrides the 'all' behaviour on a per-platform basis A default landing page (pages.ebay.com) may be updated to recognize the parameters listed above, and to enable fallback to a second path when attempts to launch the native app fail or time out. EBay® is a registered trademark of eBay, Inc.

By way of example, an ad campaign may start with a link that drives all users to the search result page (through a download if needed), taking desktop and unsupported mobile users directly to the web experience, utilizing the following link:

http://pages.ebay.com/link/?nav=item.query&keywords=smartphone+accessories

This link could be modified to drive downloads through the market portal (mobile.ebay.com) instead of continuing to the core website (to the default landing page pages.ebay.com). In the modified link, which is shown below, the 'nav_dt' parameter forces desktop navigation into the second path ('alt') behaviour (market portal), as determined by the 'alt_dt' override, as shown below.

http://pages.ebay.com/link/?nav=item.query&keywords=smartphone+accessories&nav_nav_dt=alt&alt_dt= mkt In response to an ad campaign, some mobile platforms may be configured to launch a native app, while other mobile platforms may present an interstitial; a desktop device may proceed directly to the web experience. An example with respect to a desktop is shown below.

http://pages.ebay.com/link/?nav=landing&nav_dt=alt&alt=mkt nav_dt=alt desktop devices are to use the second path (e.g., a market portal)

nav the landing page for all platforms alt=mkt all platforms drive market downloads; desktop presents the market portal interstitial Least-effort path to single landing page may be utilized, via a native app, if the native app is already installed. Mobile devices may be configured to launch the native app if installed, dropping directly into the mobile web otherwise. Desktop proceeds directly to the web experience, as shown in the example below.

http://pages.ebay.com/link/?nav=landing&alt=web nav the default landing page alt=web all platforms fall back to the web (mobile/tablet/site) experience, without checking the market Supported platforms launch the native app, driving a download if needed and also land on a page designated for a specific platform. Unsupported platforms land on a legacy page. Certain platforms (e.g., iOS) present the legacy interstitial. iOS is a mobile operating system developed and distributed by Apple Inc.

Example http://pages.ebay.com/link/?nav=landing&nav_andr=nav%3DFeatured.landing nav_andr Android® devices link to the featured landing page.

nav All other platforms use a standard landing page.

A click on a link that originates from a platform that does not support a native application may be redirected to the mobile web.

Example http://pages.ebay.com/link/?nav=landing&nav_bb=alt&alt_bb=web nav_bb=alt BlackBerry® devices always use the second path (mobile web).

nav All other platforms link to the default landing page, using the platform-default second path.

alt_bb=web BlackBerry® devices fall back to the web experience, even if a native app is installed.

If the native app is not installed on the client device, the control may be redirected to a custom interstitial before continuing to a download.

Example http://pages.ebay.com/link/?nav=landing&alt=campaigns.somepartner.com/thankYou nav All platforms link to the standard landing page if the app is already installed.

alt=<custom> If app is not installed, visit the custom campaign interstitial before proceeding to download or web.

Once an ad campaign is active, it may be desirable to disable the campaign at some point in time, or to modify the campaign behaviour (including platform-specific changes). In one embodiment, the default landing page may be configured to check a so-called 'kill list' each time a universal link is encountered. This is a mechanism that may be utilized to mitigate the customer impact of an ill-performing campaign. For example, if a campaign is constructed with a universal link that accidentally displayed a competitor's product, or was overwhelming server capacity, the kill switch could be used to terminate the campaign with as much haste as possible.

Figure 4:
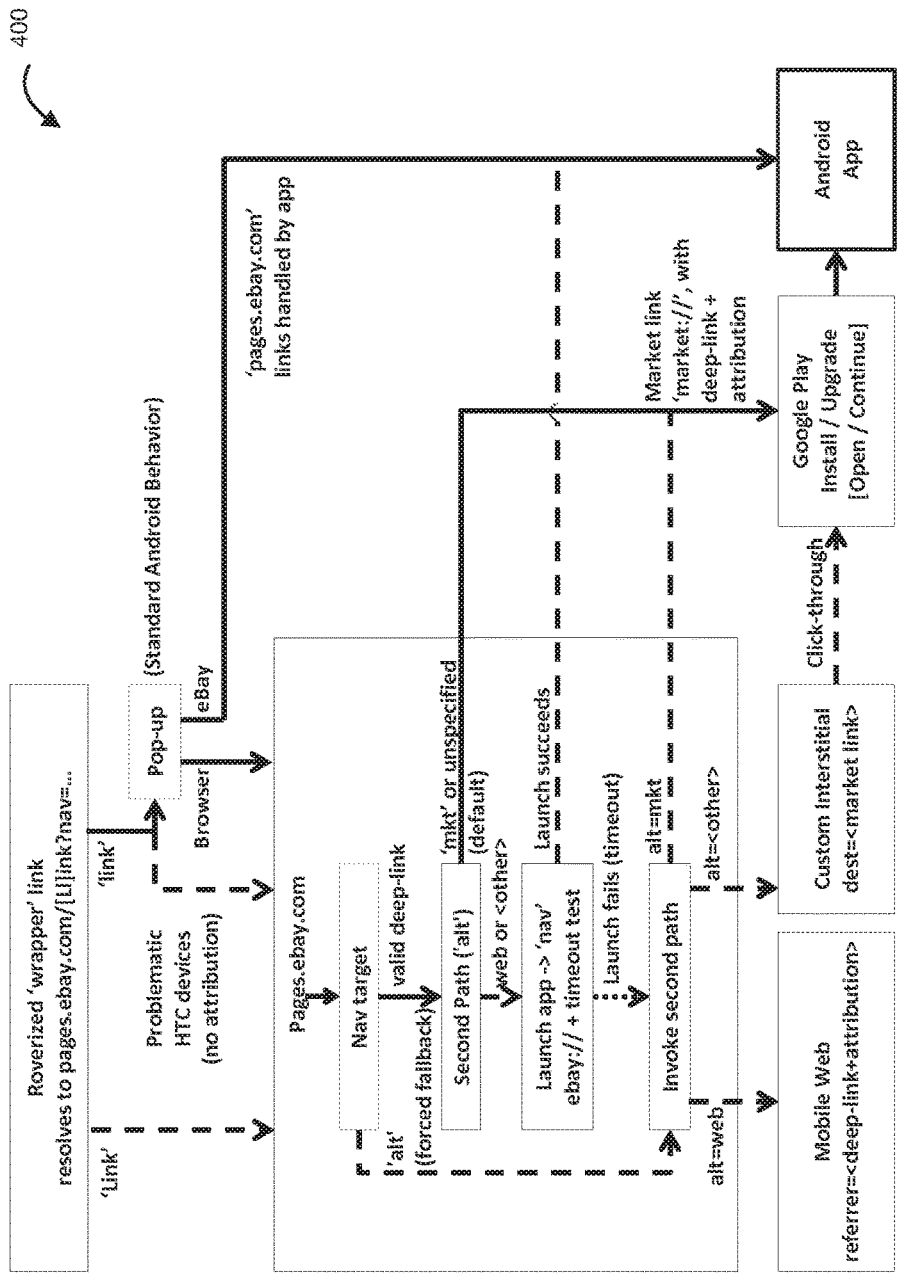
FIG. 4 is a flow chart illustrating link resolution flow for an Android® client device in the context of an on-line trading platform, in accordance with an example embodiment.

FIG. 4 is a flow chart 400 illustrating link resolution flow for an Android® client device in the context of an on-line trading platform. As shown in FIG. 4, in one embodiment, the flow starts with an abbreviated wrapper link that resolves to the default landing page pages.ebay.com. In some embodiments, a service may be provided that allows a long URL to be abbreviated. When an abbreviated URL is visited, the server redirects to the original URL. Such service may also include aspects of tracking, ad-partner communication and redirection, as well as campaign management. A URL that was abbreviated in this manner, when expanded, retains its characteristics of a universal link (a URL in a universal link format).

By default, Android® uses a market link to direct users into the native app (via the market's automatic download path if necessary). This may result in the native app detection being always positive. In FIG. 4, the solid lines indicate the default path, the dashed lines indicate the alternate path, and the dotted line indicates the recovery path.

Figure 5:
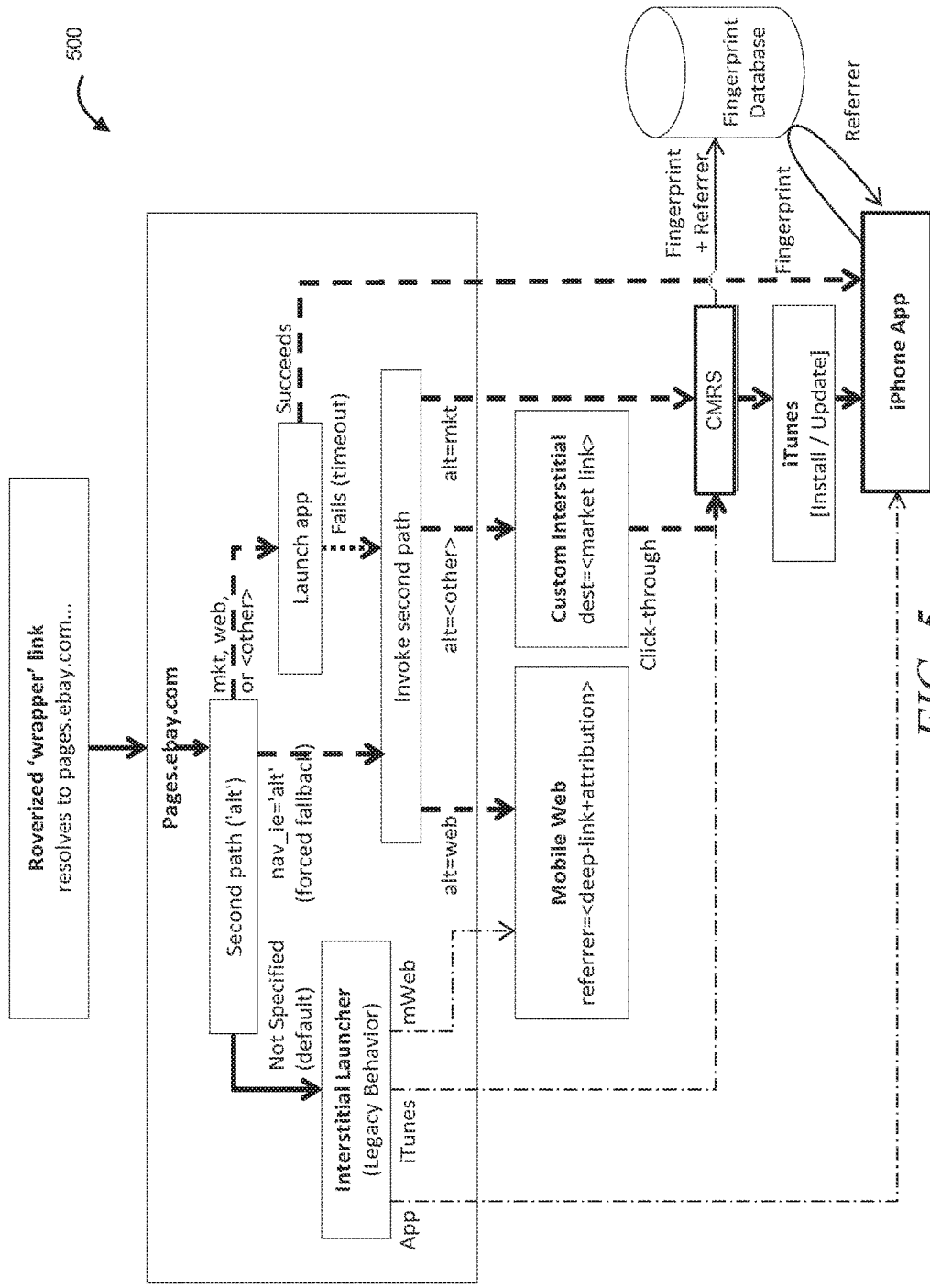
FIG. 5 is a flow chart illustrating link resolution flow for an iPhone® client device in the context of an on-line trading platform, in accordance with an example embodiment.

FIG. 5 is a flow chart 500 illustrating link resolution flow for an iPhone® client device in the context of an on-line trading platform. In FIG. 5, the solid lines indicate the default path, the dashed lines indicate the alternate path, the dot-and-dash line indicates users' choice, and the dotted line indicates the recovery path. As shown in FIG. 5, in one embodiment, the flow starts with a roverized wrapper link that resolves to the default landing page pages.ebay.com. The default behaviour on iOS is to present the interstitial. If the alt parameter is explicitly specified (with any valid value), the iOS pages.ebay.com logic does not present the interstitial. Instead, pages attempt to launch the native app directly, and detect failure of a direct-launch attempt (e.g., via a timeout), reverting failures to the alt-specified mechanism.

In some environments, a mobile app market (e.g., iTunes®) may not provide a way to propagate the link attribution through the process of downloading and launching the native app. That is, even if a universal link were to provide attribution when referring the client to the market to download the native app, there may be no mechanism supported by the app market to then pass that attribution along to the application after the native app is downloaded, installed, and eventually launched. CMRS service (or CMRS or look-up service) shown in FIG. 5 may be utilized for several purposes. For example, it may be utilized to provide an alternative means of storing the universal link's attribution during this download/install/launch scenario. Also, CMRS may be utilized to provide this attribution to the device after the initial post-download launch. CMRS may be configured to accomplish this in the following way. When the universal link redirects a client device to download the app, it may have a priori knowledge that certain app markets do not support attribution. For those markets, the universal link's 'market' path redirects the client to CMRS (or another equivalent service) instead of the market, and includes both the attribution and an CMRS 'campaign' identifier in the CMRS URL, to which the client is redirected. CMRS may be preconfigured for a particular campaign, such that visitors to this campaign would be again redirected—to the originally desired app market. Before redirection however, CMRS 'fingerprints' the device (e.g., establishes a quasi-unique identifier for the device) through proprietary means, and saves the attribution in association with the fingerprint. After redirection, the client device may proceed to the market, and then downloads, installs, and launches the application. Upon first launch of the application, the app contacts CMRS, and either supplies the device's CMRS fingerprint (via an SDK), or may be re-fingerprinted (in other embodiments). In response, CMRS retrieves and returns to the client device the attribution previously associated with the fingerprint. The app can now engage in the normal tracking and attribution flows despite the inability to communicate attribution through the market download process.

Figure 6:
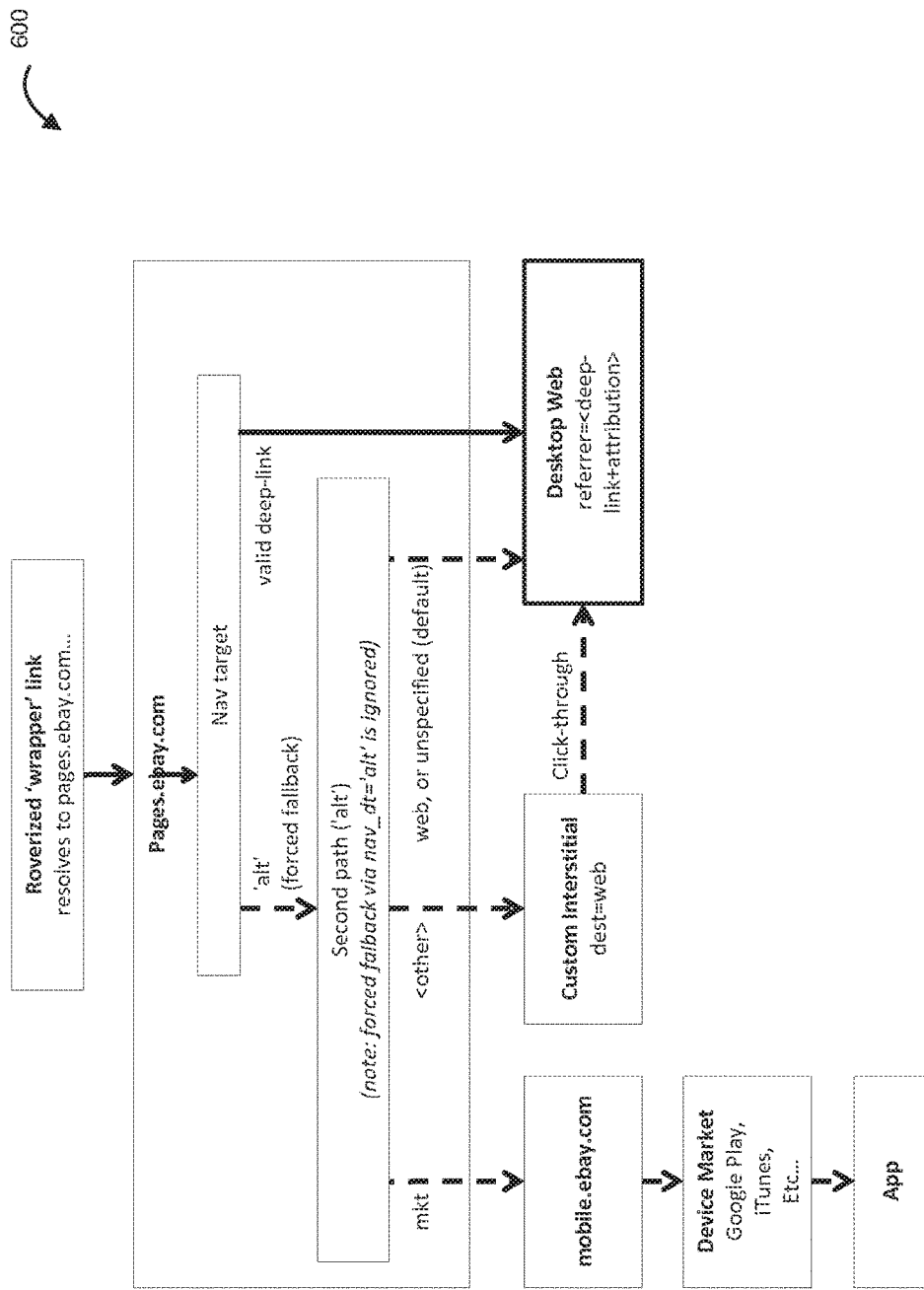
FIG. 6 is a flow chart 600 illustrating link resolution flow for a desktop client device in the context of an on-line trading platform, in accordance with an example embodiment.
Figure 7:
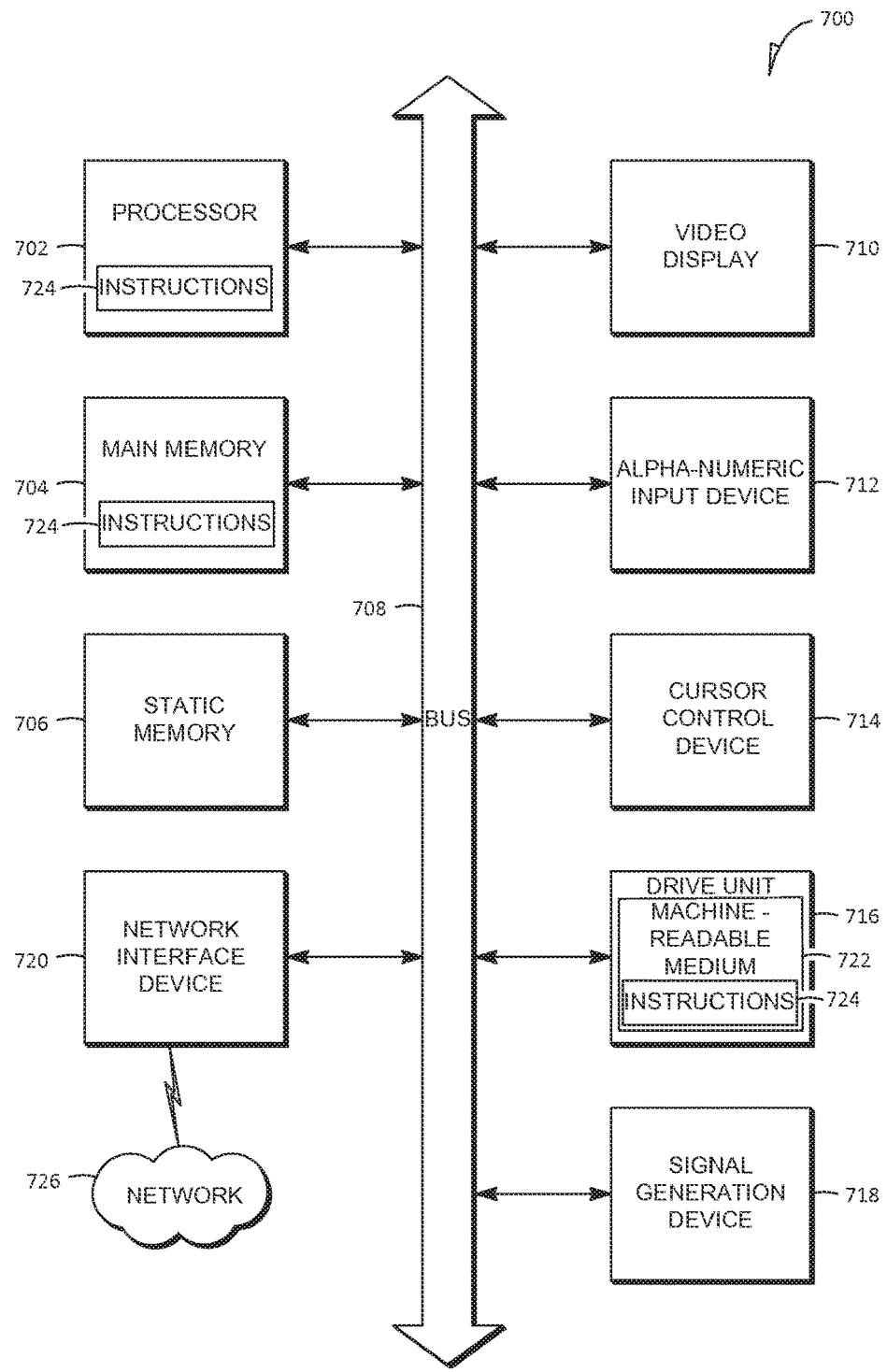
FIG. 7 is a diagrammatic representation of an example machine in the form of a computer system, within which a set of instructions, for causing the machine to perform any one or more of the methodologies discussed herein, may be executed.

FIG. 6 is a flow chart 600 illustrating link resolution flow for a desktop client device in the context of an on-line trading platform. In FIG. 6, the solid lines indicate the default path and the dashed lines indicate the alternate path.

Example JavaScript script implementing a method for using universal link format is shown in Table 1 below.

TABLE 1

```
// The non-platform 'nav' value
var navOriginal;
// nay_<plat>if present, nav otherwise
var navEffective;
// The deep link, derived from nav_<plat> if present, or nav if nav_<plat>is 'alt'
var navResolved;
// alt_<plat> if present, alt otherwise
var altEffective;
var effectiveQuery;
var effectiveDocLocation;
var NAV_DEFAULT = 'home';
var NAV_TARGET_ALT = 'alt';
var ALT_TARGET_MARKET = "mkt";
var ALT_TARGET_WEB = "web";
var ALT_TARGET_PROMPT = "prompt";
var ALT_TARGET_DEFAULT = "default";
function extractNavOverrides(source, platformSuffix, platformAltDefault)
{
   if(source == null)
      source = window.location.href;
   effectiveDocLocation = source;
   // Initialize nav - we will apply overrides later
   navOriginal = extractParamNoThrow("nav");
   navEffective = navOriginal;
   // If no alt override exists, fall back to the generic alt param, and finally to 'default'
   altEffective = extractParamNoThrow("alt_" + platforrnSuffix, null);
   if(altEffective == null)
      altEffective = extractParamNoThrow("alt", ALT_TARGET_ DEFAULT);
   if(altEffective == ALT_TARGET_DEFAULT)
      altEffective = platformAltDefault;
   // Build a dictionary of the existing query params
   // When extracting the nav override, 'nav_plat' can replace nay parameters (such as
'keywords', 'id', etc...)
   var existingQuerySegment = window.location.search;
   if(existingQuerySegment[0] == "?")
      existingQuerySegment = existingQuerySegment.substr(1);
   effectiveQuery = existingQuerySegment;
   var rawQueryParams = existingQuerySegment.split("&");
   var effectiveQueryMap = new Object( );
   for(kvpIndex in rawQueryParams)
   {
      var kvp = rawQueryParams[kvpIndex];
      var paramNameAndValue = kvp.split("=");
      var paramName = paramNameAndValue[0];
      var paramValue = null;
      if(paramNameAndValue.length > 1)
         paramValue = paramNameAndValue[1];
      effectiveQueryMap[paramName] = paramValue;
   }
```

TABLE 1-continued

```
    // Extract nav override
    var navOverrideParam = "nav_" + platformSuffix;
    // Extract the nav override (which will be decoded)
    var navOverride = extractParamNoThrow(navOverrideParam, null, null);
    if(navOverride != null)
    {
      // nav=alt sets navEffective=alt
      // nav=<anything else> replaces nav with the encoded nav
      if(navOverride != NAV_TARGET_ALT)
      {
        // nav override contains replacement 'nav', and any nav-specific
parameters
        var replacementParams = navOverride.split("&");
        // For each replacement param, update the effectiveQueryMap
        for (var replacementParamIndex = 0;
              replacementParamIndex <
replacementParams.length;
              ++replacementParamIndex)
        {
          var paramNameAndValue =
replacementParams[replacementParamIndex].split("=");
          var paramName = paramNameAndValue[0];
          var paramValue = null;
          // Query params do not require a value...
          if(paramNameAndValue.length > 1)
            paramValue =paramNameAndValue[1];
          effectiveQueryMap[paramName] = paramValue;
        }
        // Remove the override, now that we've applied it to the original
URL
        delete effectiveQueryMap[navOverrideParam];
      }
      // Clean out unused overrides and rebuild the query
      effectiveQuery = "?";
      for(query-Key in effectiveQueryMap)
      {
        // Discard other overrides for other platforms
        if(queryKey.substr(0,4) == "nav_" || queryKey.substr(0,4) ==
"alt_")
          continue;
        if(effectiveQuery != "?")
          effectiveQuery += "&";
        effectiveQuery += queryKey + "=" +
effectiveQueryMap[queryKey];
      }
      // replace the query segment
      effectiveDocLocation = effectiveDocLocation.split("?")[0] +
effectiveQuery;
      if(navOverride == NAV_TARGET_ALT)
      {
        // Set the effective nav to 'alt', but leave the effective doc location
unchanged
        // since we don't have any parameters to actually override.
        navEffective = navOverride;
      }
      else
      {
        navEffective = extractParamNoThrow("nav", NAV_DEFAULT,
effectiveQuery);
      }
    }
    // If nav_andr was 'alt', use the original 'nav' for the actual deep link target
    navResolved = navEffective;
    if(navResolved == "alt")
      navResolved = navOriginal;
}
```

FIG. 4 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a drive unit 716, a signal generation device 718 (e.g., a speaker) and a network interface device 720.

The drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to share content utilizing universal link format have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
    obtaining, at a client device, a web script from a resource host computer;
    detecting, at the client device, a request to access target content, the target content provided by the resource host computer;
    in response to detecting the request and at the client device:
    determining that the request is associated with a uniform resource locator (URL) in a universal link format in which the URL includes a plurality of directives that include:
    two or more platform-specific execution directives that instruct, based on corresponding potential platforms of potential client devices, to which of a plurality of potential execution environments of the potential client devices to direct the target content, and
    one or more landing page selection directives that indicate, based on the potential execution environments, which of a plurality of landing pages to select, wherein the plurality of landing pages are hosted by the resource host computer and are configured to present the target content;
    determining, using the obtained web script, a particular platform of the client device that includes particular hardware and a particular operating system that are based on a type of the client device, the determining of the particular platform including identification of the particular hardware and the particular operating system, wherein a plurality of execution environments are installed on the client device and are configured to be executed within a setting provided by the particular hardware and the particular operating system of the particular platform;
    identifying, using the obtained web script, from the two or more platform-specific execution directives and based on the particular platform, one or more particular platform-specific directives that are associated with the particular platform;
    selecting, using the obtained web script, from the plurality of execution environments, a particular execution environment of the client device for presenting the requested target content as instructed by the one or more particular platform-specific directives;
    selecting, using the obtained web script, from the plurality of landing pages, a particular landing page based on a particular landing page selection directive of the one or more landing page selection directives that is associated with the particular execution environment;
    sending, by the client device, the URL with one or more parameters that specify the particular landing page based on selecting the particular landing page; and
    using the particular execution environment based on selecting the particular execution environment, presenting the particular landing page.

2. The method of claim 1, wherein the particular execution environment is a browser application.

3. The method of claim 1, wherein:
    the particular platform of the client device is a mobile platform; and
    the particular execution environment is an application native to the mobile platform.

4. The method of claim 1, comprising:
    detecting that the particular execution environment is not present on the client device; and
    causing the particular execution environment to be downloaded to the client device.

5. The method of claim 1, wherein the selecting of the particular execution environment comprises executing web script that is a JavaScript script.

6. The method of claim 1, wherein the request to access the target content is in response to a click on a uniform resource locator (URL) at the client device.

7. The method of claim 1, wherein the request to access the target content is in response to a click on a user interface (UI) element presented on a web page.

8. The method of claim 7, wherein the web page is provided to the client device by an on-line trading platform.

9. A computer-implemented system comprising:
    a memory having instructions stored thereon; and
    at least one processor coupled to the memory and configured to, in response to execution of the instructions, cause the performance of operations, the operations comprising:
    obtain, at a client device, a web script from a resource host computer;
    detect, at the client device, a request to access target content, the target content provided by the resource host computer;
    in response to detecting the request and at a universal link interpreter of the client device:
    determine that the request is associated with a uniform resource locator (URL), the URL comprising one or more directives that include one or more landing page selection directives that indicate, based on potential execution environments, which of a plurality of landing pages associated with the target content to select;

determine, using the obtained web script, a particular platform of the client device that includes particular hardware and a particular operating system that are based on a type of the client device, wherein a plurality of execution environments are installed on the client device and are configured to be executed within a setting provided by the particular hardware and the particular operating system of the particular platform;

identify, using the obtained web script, from the one or more directives and based on the particular platform, one or more particular landing page selection directives that are associated with the particular platform and that indicate which of a plurality of landing pages to select, wherein the plurality of landing pages are hosted by the resource host computer and are configured to present the target content;

select, using the obtained web script, from the plurality of landing pages, a particular landing page based on the one or more particular landing page selection directives; and send, by the client device, the URL with one or more parameters that specify the particular landing page based on selecting the particular landing page; and display the particular landing page using a particular execution environment selected, using the obtained web script, from the plurality of execution environments, based on the particular platform according to one or more execution directives of the one or more directives that are associated with the particular platform.

10. The system of claim 9, wherein the particular execution environment is a browser application.

11. The system of claim 9, wherein:
the particular platform of the client device is a mobile platform; and
the particular execution environment is an application native to the mobile platform.

12. The system of claim 9, wherein the operations further comprise:
detect that the particular execution environment is not present on the client device; and
cause the particular execution environment to be downloaded to the client device.

13. The system of claim 9, wherein the web script is a JavaScript script.

14. The system of claim 9, wherein the request to access the target content is in response to a click on a uniform resource locator (URL) at the client device.

15. The system of claim 9, wherein the request to access the target content is in response to a click on a user interface (UI) element presented on a web page.

16. A machine-readable non-transitory storage medium having instruction data to cause a machine to perform operations comprising:

obtaining, at a client device, a web script from a resource host computer;

detecting, at the client device, a request to access target content, the target content provided by the resource host computer;

in response to detecting the request and at the client device:

determining that the request is associated with a uniform resource locator (URL) in a universal link format in which the URL includes a plurality of directives that include:

one or more platform-specific execution directives that indicate, based on corresponding potential platforms of potential client devices, to which of a plurality of potential execution environments of the potential client devices to direct the target content, and one or more landing page selection directives that indicate, based on the potential execution environments, which of a plurality of landing pages to select, wherein the plurality of landing pages are hosted by the resource host computer and are configured to present the target content;

determining, using the obtained web script, a particular platform of the client device that includes particular hardware and a particular operating system that are based on a type of the client device, wherein a plurality of execution environments are installed on the client device and are configured to be executed within a setting provided by the particular hardware and the particular operating system of the particular platform;

comparing the one or more platform-specific execution directives with the particular platform;

identifying, using the obtained web script, from the one or more platform-specific execution directives and based on the comparing of the one or more platform-specific execution directives with the particular platform, one or more particular platform-specific directives that are associated with the particular platform;

selecting, using the obtained web script, from the plurality of execution environments, a particular execution environment of the client device for presenting the requested target content based on the one or more particular platform-specific directives;

selecting, using the obtained web script, a particular landing page based on one or more landing page selection directives of the plurality of directives that are associated with the particular execution environment, wherein the particular landing page is hosted by the resource host computer and is configured to present the target content;

sending, by the client device, the URL with one or more parameters that specify the particular landing page based on selecting the particular landing page; and using the particular execution environment based on selecting the particular execution environment, presenting the particular landing page.

17. The method of claim 1, wherein identifying the particular platform of the client device includes identifying web browser information and operating system information of the client device based on Hypertext Transfer Protocol (HTTP) header information.

18. The system of claim 9, wherein identifying the particular platform of the client device includes identifying web browser information and operating system information of the client device based on Hypertext Transfer Protocol (HTTP) header information.

* * * * *